United States Patent [19]

Harms et al.

[11] Patent Number: 4,772,646

[45] Date of Patent: Sep. 20, 1988

[54] CONCENTRATED HYDROPHILIC POLYMER SUSPENSIONS

[75] Inventors: Weldon M. Harms; Lewis R. Norman, both of Duncan, Okla.

[73] Assignee: Halliburton Company, Duncan, Okla.

[21] Appl. No.: 931,761

[22] Filed: Nov. 17, 1986

[51] Int. Cl.$^4$ .......................... C08J 3/02; C08L 1/28; C08L 5/00; C09K 7/00
[52] U.S. Cl. ........................................ 524/27; 524/29; 524/31; 524/32; 524/35; 524/37; 524/38; 524/39; 524/40; 524/41; 524/42; 524/43; 524/44; 524/45; 524/46; 524/47; 524/48; 524/50; 524/51; 524/52; 524/53; 524/54; 524/55; 523/336
[58] Field of Search ............... 524/27, 28, 29, 30, 524/31, 32, 35, 37, 38, 39, 40, 41, 42, 43, 44, 45, 46, 47, 48, 49, 50, 51, 52, 53, 54, 55; 523/336

[56] References Cited

U.S. PATENT DOCUMENTS

| | | | |
|---|---|---|---|
| 4,312,675 | 1/1982 | Pickens et al. | 106/171 |
| 4,435,217 | 3/1984 | House | 106/171 |
| 4,670,501 | 6/1987 | Dymond et al. | 524/801 |

FOREIGN PATENT DOCUMENTS 0161926 11/1985 European Pat. Off. .

*Primary Examiner*—John Kight
*Assistant Examiner*—Nathan M. Nutter
*Attorney, Agent, or Firm*—Robert A. Kent

[57] ABSTRACT

The present invention relates to a liquid suspension of a high molecular weight, water-soluble polymer or water-soluble salt prepared by admixing and water-soluble polymer with a hydrocarbon carrier fluid and a suspending agent comprising an aqueous emulsion of a copolymer comprising a water-insoluble and substantially hydrocarbon-insoluble polymer consisting of particles having a dry weight average particle size of below 10 $\mu$m and which is formed from monomers of which 80% to 100% are hydrophobic, 30 to 100% are polar and 0% to 20% are hydrophilic. More particularly, the copolymer comprises from about 80% to about 100% $C_{1-30}$ alkyl methacrylate monomers and from about 0% to about 20% hydrophilic monomers. Preferably, the copolymer comprises 90% to 100% 2-ethylhexylacrylate and from about 0.5% to about 10% acrylic acid. The liquid suspension is capable of supporting about 5 pounds of water-soluble polymer per gallon of suspension.

19 Claims, No Drawings

CONCENTRATED HYDROPHILIC POLYMER SUSPENSIONS

BACKGROUND OF THE INVENTION

1. Field of the Invention

The present invention relates to new improved compositions and methods for dispersing hydrophilic water-soluble polymers in aqueous liquids.

It is well known in the art that high molecular weight hydrophilic water-soluble polymers are very difficult to disperse in aqueous liquids. In conventional processes for dissolving such polymers, dry powdered polymer is fed slowly and carefully into the vortex of a vigorously stirred body of water. However, it is frequently difficult to do this in actual operation for a number of reasons. The desired end result is to completely separate and wet each individual polymer particle so no agglomerated particles form, commonly called fish eyes. Mechanical feeders frequently fail and are less than 100% efficient. Sifting polymers by hand is a highly tedious procedure. Often, for example, personnel tend to simply dump the powder into the water, start up the stirrer and expect the material to dissolve. Under such circumstances, the polymers swell and ball up into extremely viscous masses with dry and unswollen material inside which the water cannot even reach to dissolve. Many undissolved, so-called "fish eyes," result. Fish eyes may not necessarily float. Fish eyes may sink to the bottom of the tank, depending upon the density of the fish eyes and the aqueous liquid. Under normal circumstances, depending on the particular water-soluble polymer, it is impossible to get such a mass to completely dissolve even after hours or even days of stirring. For this reason, a considerable amount of work has been done in an attempt to develop improved and useful methods for producing dispersions and solutions of high molecular weight, water-soluble polymers in water. Sometimes the dry powdered polymer is wetted with a water-soluble organic solvent or it may be wetted with a surface active material in an attempt to improve the penetration of liquid into the particles, at the same time acting to separate them. Considerable fractions of water-soluble inert salts, such as sodium chloride or effervescing salts, may be used in order to separate the particles of polymer and reduce their tendency to ball up into insoluble masses. Mechanical feed devices and eductors operated by flowing water have been described and are comercially used for this purpose. Sometimes such devices work well with cold water, but may give considerable difficulty when used with warm or hot water.

Certain high molecular weight, water-soluble polymers such as the various cellulose ethers, xanthan gum, guar gum and the like have been surface treated with crosslinking agents, such as glyoxal, to decrease the rate of hydration of these polymers in aqueous liquids. In this manner, the polymers are able to be dispersed before they start to hydrate (solubilize).

Concentrated suspensions of water-soluble polymers in inert organic liquids which do not appreciably swell the polymers recently have been introduced to the drilling industry. Such suspensions generally contain a high concentration of the water-soluble polymer, an organic suspending medium such as a hydrocarbon, a surfactant for enhancing the release of the polymer into an aqueous liquid and a suspending agent such as an organophilic clay. A formula and method for preparing a liquid hydroxyethylcellulose (HEC) suspension published by Union Carbide Corporation consists of 1.39% BENTONE 34 organophilic clay, 0.28% methanol, 42.5% HEC-25, and 2% TERGITOL NP-10 surfactant in a hydrocarbon (diesel fuel). A formula and method for preparing a liquid HEC suspension published by Hercules Incorporated consists of 37.0% NATROSOL 250-HHW (HEC), 40.1% of an ethyl hexanol premix containing 1% KLUCEL H hydroxypropyl cellulose, 21.1% ISOPAR M oil, and 1.8% BRIJ SP35 surfactant. A formula and method for preparing a liquid xanthan gum suspension published by Kelco Div., Merck & Co., Inc. consists of 53% mineral oil, 1% EMEREST 2648 surfactant, 1% TRITON x-45 surfactant, 40% KOD85 xanthan gum biopolymer, 1% isopropyl alcohol, and 4% organophilic clay. Diesel fuel can be substituted for the mineral oil provided 7% organophilic clay is used in the liquid polymer composition.

These methods of suspending the water-soluble polymers suffer from various deficiencies including: incomplete suspension resulting in hard packing of the polymer on standing, hydration of the suspension on storage, poor dispersion of the polymer into aqueous liquids under conditions of low shear mixing and the like.

It would be desirable to provide a method of suspending water-soluble polymers prior to adxixture with an aqueous liquid which overcome at least some of the problems associated with the currently available suspensions.

SUMMARY OF THE INVENTION

The discovery now has been made that liquid suspension of a high-molecular weight, water-soluble polymer or a water-soluble salt can be prepared by admixing the watersoluble polymer with a hydrocarbon carrier fluid and a suspending agent comprising an aqueous emulsion of a copolymer comprising a water-insoluble and substantially hydrocarbon-insoluble polymer consisting of particles having a dry weight average particle size of below 10μm and which is formed from monomers of which 80% to 100% are hydrophobic, 30 to 100% are polar and 0% to 20% are hydrophilic. More particularly, the copolymer comprises from about 80% to about 100% $C_{1-30}$ alkyl methacrylate monomers and from about 0% to about 20% hydrophilic monomers. Preferably, the copolymer comprises 90% to 100% 2-ethylhexylacrylate and from about 0.5% to about 10% acrylic acid. The liquid suspension is capable of supporting about 5 pounds of water-soluble polymer per gallon of suspension.

DESCRIPTION OF THE PREFERRED EMBODIMENT

The hydrocarbon carrier fluid useful in the present invention may be any which has no substantial swelling effect on the water-soluble polymer utilized in the invertion. Preferably, the hydrocarbon comprises a distilled petroleum fraction having a low viscosity and high flash point for safety reasons. Suitable hydrocarbons include mineral oils, diesel fuel, kerosene, various other petroleum fractions and the like. The most preferred hydrocarbon is diesel.

The water-soluble polymer useful in this invention is a water dispersible or soluble hydrophilic colloid selected from the group consisting of cellulose derivatives, starch derivatives, gum ghatti, gum arabic, gum tragacanth, locust bean gum, gum karaya, guar gum, carrageenan, algin, biopolymers and mixtures thereof.

These polymers may be used unmodified, as normally isolated from their source materials, or they may be modified by hydroxyalkylation, carboxyalkylation, or mixed hydroxyalkylation carboxyalkylation to form ether derivatives, such as hydroxyethyl ethers, hydroxypropyl ethers, carboxymethyl ethers, mixed hydroxyethylcarboxymethyl ethers and the like, as is well known in the polymer art. Many of these derivatives form clear solutions in water. Thus, the term water-soluble polymer is intended to mean polymers which form colloidal solutions or colloidal dispersions in water.

Accordingly, the invention provides a liquid polymer composition wherein the polymer preferably may comprise gum ghatti, gum arabic, gum tragacanth, locust tean gum, gum karaya, guar gum, carrageenan, algin, biopolymers, hydroxyethylcellulose, hydroxyethyl ghatti gum, hydroxyethyl arabic gum, hydroxyethyl tragacanth gum, hydroxyethyl locust bean gum, hydroxyethyl karaya gum, hydroxyethyl guar gum, hydroxyethyl carrageenan, hydroxyethyl alginate, hydroxyethyl xanthan gum, carboxymethyl cellulose, carboxymethyl ghatti gum, carboxymethyl arabic gum, carboxymethyl tragacanth gum, carboxymethyl locust bean gum, carboxymethyl karaya gum, carboxymethyl guar gum, carboxymethyl carrageenan, carboxymethyl alginates, carboxymethyl xanthan gum, carboxymethylhydroxymethyl cellulose, carboxymethylhydroxyethyl ghatti gum, carboxymethylhydroxyethyl arabic gum, carboxymethylhydroxyethyl tragacanth gum, carboxymethylhydroxyethyl locust bean gum, carboxymethylhydroxyethyl karaya gum, carboxymethylhydroxyethyl guar gum, carboxymethylhydroxyethyl carrageenan, carboxymethylhydroxyethyl alginates, carboxymethylhydroxyethyl xanthan gum, carboxymethylhydroxyethyl cellulose, hydroxypropyl ghatti gum, hydroxypropyl arabic gum, hydroxypropyl tragacanth gum, hydroxypropyl bean gum, hydroxypropyl karaya gum, hydroxypropyl guar gum, hydroxypropyl carrageenan, hydroxypropyl alginates, hydroxypropyl xanthan gum, alkyl hydroxyethyl cellulose, carboxymethyl starch, hydroxyethylstarch, carboxymethylhydroxyethyl starch and mixtures thereof.

The most preferred polymers for use in the present invention are guar gum, hydroxypropylguar, carboxymethylhydroxypropylguar hydroxyethylcellulose and carboxymethylhydroxyethylcellulose.

The water-soluble salt useful in this invention is selected from substantially any salt that is soluble in water and substantially insoluble in a hydrocarbon. The salt can comprise, for example, sodium chloride, potassium chloride, sodium carbonate, sodium bicarbonate, potassium carbonate, potassium bicarbonate and the like.

The suspending agent comprises a water insoluble copolymer which also is insoluble in a hydrocarbon but which is substantially swollen by the hydrocarbon. To provide suspension to the water-soluble polymer when adxixed with the hydrocarbon, the particles of the suspending agent must swell to at least 4 to 6 times their dry volume.

If the suspending agent swells to the extent that the polymer tends towards full solubility the benefits of the invention may be lessened and so generally compounds are selected in which the particles do not swell by more than 30 times, or at the most 50 times, their dry volume. Best results are generally obtained when the particles swell by from 10 to 25 times their dry volume.

The viscosifying properties are partly due to the imbibition and immobilization of the hydrocarbon in the swollen particles and partly due to particle-particle interactions and so th specified small particle size is essential. The weight average particle size is preferably below about 5 μm but is normally above about 0.02, and preferably, above about 0.05 μm. Best results are generally achieved with a weight average particle size of from 0.1 to 2 micron. Preferably at least 80%, and most preferably, at least 90% by weight of the particles have a size below about 10 μm, and preferably from about 0.05 to about 5 μm and, most preferably, about 0.1 to 4 μm.

The particles that contribute most effectively to the viscosifying effect appear to be those that are above about 0.2 μm, and preferably above about 0.4 μm, and generally below about 10 μm, preferably below about 5 μm. Preferably, at least 30%, most preferably at least 50% by weight of the particles are in the size range of from about 0.3 to 5, and most preferably, from about 0.5 to 3 μm. Dispersions having these size ranges are new.

The polymers are best made by dispersing polymerizable monomer or monomers in a liquid in which they are substantially insoluble and polymerizing the monomer or monomers in that liquid to form a dispersion in the liquid of polymer particles having the desired particle size. This particle size can be controlled in known manner, for instance by appropriate choice of emulsifier and the amount of emulsifier. The process is conveniently referred to as emulsion polymerization since the final particle size is always small.

The liquid in which the emulsion polymerization is conducted is generally water and so the resultant dispersion is a dispersion of particles in a continuous aqueous phase. The water may include various additives to improve physical properties. For instance, ethylene glycol may be include to improve freeze-thaw stability.

At least 20, usually at least 30 and, preferably, at least about 50%, by weight of the recurring groups in the polymer should be polar, and thus when the polymer is made by copolymerization of monomers at least about 50% by weight of the monomers should be polar monomers. By referring to polar monomers in groups, it is meant groups having a significant polarity, generally caused by the inclusion of a carboxylic and/or amide group substitute on to a hydrocarbon backbone. The presence of a substantial proportion of polar groups in the polymer within the non-polar or other water immiscible liquid appears to promote the particle-particle interactions in a beneficial manner.

The presence in the polymer of a high proportion of aromatic hydrocarbon groups tends to make it difficult or impossible, to obtain the desired combination of particle-particle interaction, insolubility and swellability and so the monomers from which the polymer is formed should not contain above about 30% aromatic hydrocarbon monomers and, preferably, are substantially free, and most usually totally free, of aromatic hydrocarbons.

Although it appears necessary to include polar monomers for best results, it is necessary that at least most of the polar monomers are hydrophobic, as otherwise the polymer will be water soluble and/or non-swellable in the hydrocarbon carrier fluid. However, the presence of a small amount of hydrophilic monomers appears desirable. By hydrophilic, it is meant that the monomer has a solubility of above about 3% by weight in water at room temperature, and by hydrophobic, it is meant that it has solubility of below about 3% by weight in water at room temperature (20° C). The preferred polymers are formed from about 0 to 20% by weight hydrophilic monomers, from about 25 to 100% by weight polar hydrophobic monomers and from about 0 to 75% by weight non-polar hydrophobic monomers. If the amount of non-polar hydrophobic monomer is above about 30% then it will generally consist of ethylene and, preferably, the only non-polar hydrophobic monomer included in the polymers of the invention is ethylene. Best results are generally obtained when the amount of polar hydrophobic monomers is from about 50 to 100%, most preferably about 80% or more by weight.

Suitable polar hydrophobic monomers include alkyl (meth) acrylates, the monoesters or diesters of dibasic ethylenically unsaturated acids such as alkyl itaconates, alkyl maleates (that is, the half ester of stearyl alcohol with maleic anhydride) and alkyl fumarates and vinyl esters of long chain acids, such as vinyl stearate, laurate and versatate. Hydrophobic N-alkyl substituted (meth) acrylamides also may be used. Preferably, at least about 50% by weight, and most preferably, at least about 80% by weight of the monomers are (meth) acrylic monomers, generally alkyl acrylate monomers. The hydrophobic monomers preferably include an alkyl group that contains up to about 30 carbon atoms, preferably from about 6 to 18 and, most preferably from about 6 to 10 carbon atoms. Particularly preferred are copolymers of from about 90% to 100% by weight $C_{1-30}$ alkyl (meth) acrylate and from about 0% to 10% by weight hydrophilic monomer, and especially preferred are those wherein the polymer contains from about 40% to 100% by weight $C_{6-10}$ alkyl acrylate.

A particularly preferred monomer is 2-ethyl hexyl acrylate. Valuable polymers are formed from about 40% to 100% of this, from about 0% to 10% hydrophilic groups and other $C_{6-30}$ alkyl (meth) acrylate, and preferably from about 0% to 50% $C_{12-18}$ alkyl (meth) acrylate.

Other polar hydrophobic monomers that may be used include vinyl acetate, for instance, copolymerized with ethylene and/or vinyl versatate.

The polymer particles used in the invention preferably have a relatively hydrophilic coating as this seems to promote particle-particle interactions within the hydrocarbon carrier fluid. The hydrophilic coating may be an external coating of, for instance, an emulsifier or some other material present during the polymerization but preferably is formed by copolymerization of hydrophilic monomer. The hydrophilic monomer may be any monomer that will provide polar oxygen-containing or nitrogen-containing groups on the surfaces during the polymerization or in some other way. Suitable hydrophilic comonomers that may be used include dialkyl amino alkyl (meth) acrylates and their quaternary addition and acid salts, acrylamide, N-(dialkyl amino alkyl) acrylamide, and meth acrylamides and their quaternary addition and acid salts hydroxy alkyl (meth) acrylates and sulphonic acids such as vinyl sulphonic acid (as the free acid or, preferably, the alkyl amino salt) or unsaturated carboxylic acids such as methacrylic acid or, preferably acrylic acid, generally as the free acid but possibly as an alkyl amino salt. Other preferred monomers include hydroxyethyl (or propyl) acrylate, acrylamide and dimethylaminoethylmethacrylate (generally as a quaternary salt).

If the hydrophilic monomers are present in too great an amount, it may be difficult to obtain the desired small particle size. Accordingly, the amount of the hydrophilic polymer is generally below about 20% and, preferably, below about 5%. The amount is normally at least about 0.05%, and preferably at least about 0.1%, and most preferably at least about 0.5%. Particularly preferred polymers are those obtained using acrylic acid, preferably in an amount of from about 0.3 to 3%, as a copolymer with other monomers that are mainly alkyl (meth) acrylate, preferably mainly $C_{6-10}$ alkyl acrylate monomers.

The polymers useful in the invention preferably have a glass transition temperature ($T_g$) below about 25° C. often below 10° C. and most preferably, below 0° C. Best results are generally obtained when $T_g$ is below $-20°$ C., most preferably, in the range $-40°$ to $-70°$ or $-75°$ C.

The polymers used in the invention are preferably film forming at 20° C., that is to say, if the dispersion of the polymer is cast on a surface at room temperature the polymer will form a film.

The preferred polymers have greater than 30% particles in the range of from about 0.5 to 5 µm, are film forming at 20° C., swell to at least four times, preferably 10 to 20 times, their volume in a hydrocarbon liquid, and are formed mainly of hydrophobic polar monomers, optionally with ethylene, and preferably with from about 0.2% to 5% by weight of a water-soluble, hydrophilic monomer.

The polymer particles preferably remain in the aqueous dispersion in which they are formed prior to incorporation with the hydrocarbon carrier fluid and should not be dried or otherwise separated from the dispersion. With the preferred film forming, low Tg, polymers it would be difficult or impossible to separate the particles while retaining the desired small particle size. If polymers having higher Tg values were obtained, separation might be possible but the resultant product would be very dusty and difficult to handle. However, even apart from this, it has been found that the viscosifying characteristics of the polymer are reduced if the polymer is separated from the aqueous dispersion prior to use.

The polymer is preferably formed from monomers such that, without additional crosslinking agent, it has the desired combination of swellability and insolubility in the liquid hydrocarbon. However, if a chosen combination of, for instance, polar acrylate monomers and acrylic acid results in the polymer being too swellable, or perhaps even soluble, then a multi-functional crosslinking monomer may be added so as to render the polymer truly crosslinked. The crosslinking monomer will generally be a hydrophobic crosslinking monomer such as diallyl phthalate. Any of the known multi-ethylenically unsaturated hydrophobic crosslinking agents can be used in place of diallyl phthalate. The amount of crosslinking agent, if added, is generally in the range of from about 0.01 to 2%, and preferably from about 0.2 to 0.8% by weight of the monomers. In general, best results are obtained without the addition of crosslinking agent. It is surprising that substantially linear polymers formed mainly of acrylic or other polar groups are superior to, for instance, crosslinked polymers formed mainly or wholly of hydrophobic hydrocarbon groups since it might have been expected that these crosslinked hydrocarbon polymers would have a far greater effectiveness as thickening agents in hydrocarbon liquids or other nonpolar liquids.

The aqueous dispersions used in the invention may be made by conventional oil-in-water emulsion polymerization, for instance, by dispersing the monomer or blend of monomers into water in the presence of an oil-inwater emulsifier or surfactant, for instance using a high speed Waring mixer, and may contain an appropriate polymerization initiator. Polymerization may be initiated in any conventional manner, such as for example, by thermal or redox initiator. Although it is often considered that anionic emulsifiers are the most effective in such polymerizations, it has been found to be particularly desirable to use nonionic emulsifiers. These seem to promote the formation of the preferred particle size distribution. Accordingly, a liquid aqueous composition according to the invention cortains dispersed polymer particles wherein the polymer is formed from ethylenically unsaturated monomers of which at least about 80% by weight are hydrophobic and up to about 20% by weight are hydrophilic provided that not more than about 30% of the monomers are aromatic, the particles are water insoluble having a dry weight average particle size of below 10 μm and are insoluble but swellable by liquid hydrocarbons, and the composition contains from about 2 to 20%, by weight based on the weight of polymer, of a non-ionic surfactant.

Suitable non-ionic surfactants are alkoxylates cf long chain alcohols or, preferably, alkoxylates of alkyl phenols, wherein the alkoxy groups are preferably ethoxy and the alkyl groups are preferably nonyl, although some propoxy substitution is sometimes useful, as sometimes are substituted octyl phenols.

The suspending agent is adxixed with the hydrocarbon carrier fluid in an amount of active material of from about 0.1% to about 15% by weight of the hydrocarbon and, preferably, from about 1% to about 10% by weight of the hydrocarbon.

In one embodiment, the suspending agent comprising an emulsion of about 40% active material, by weight, is adxixed with the hydrocarbon carrier fluid in an amount of from about 0.25% to about 25% and, preferably from about 1.5% to about 12% by volume of the hydrocarbon. It is to be understood that the portions admixed with the hydrocarbon carrier fluid should be adjusted in relation to the active material content for other suspending agent compositions.

In accordance with the present invention, the hydrocarbon carrier fluid first is introduced into a suitable mixing vessel. Thereafter, about 0% to about 100% of the total quantity of suspending agent is thoroughly adxixed with the hydrocarbon. The suspending agent provides no substantial increase in viscosity to the hydrocarbon upon initial admixing. The initial amount of suspnding agent is selected according to the efficiency of the mixing equiprint being used. The water-soluble polymer then is admixed with the mixture to form the suspension. Upon completion of polymer addition, any remaining suspending agent is admixed with the suspension. Surprisingly, it has been found that upon addition of the water-soluble polymer to the suspension, the water and hydrocarbon insoluble polymer of the suspending agent is caused to be at least partially separated from the emulsion and swell in the hydrocarbon to impart viscosity thereto. While the specific mechanism is unknown, it is believed that the water-soluble polymer absorbs the water from the suspending agent thereby permitting the surface of the water and hydrocarbon insoluble polymer to be exposed to the hydrocarbon carrier fluid whereupon it swells to impart viscosity to the hydrocarbon. The viscosified hydrocarbon carrier fluid then readily supports the water-soluble polymer. It has been found to be highly desirable to admix the constituents of the suspension by circulation through a centrifugal pump or other apparatus capable of apparting high shear to the mixture. The failure to impart high shear to the mixture during adxixing of the water-soluble polymer results in the formation of a high-viscosity sludge comprising a portion of the water-soluble polymer which separates from the suspension and rapidly settles to the bottom of the mixing or storage vessel. The sludge cannot be pumped from the vessel without redispersion which is often very difficult.

When the suspension is admixed in accordance with the foregoing procedure, the water-soluble polymer remains readily suspended in the hydrocarbon without hard packing or other significant settling problems. Any water-soluble polymer which settles is easily redispersed upon any further pumping or mixing of the suspension. The suspension can contain from about 2% to about 60% by weight of water-soluble polymer and remain a uniform dispersion. Particularly desirable are suspensions containing from about 25% to about 60% by weight water-soluble polymer.

Suspensions of the water-soluble salt are formed in the same manner as described for the water-soluble polymer. The suspensions of the present invention also may contain other materials to impart special properties to the composition or to the aqueous liquids in which the suspensions are used. Thus, the suspension may contain antioxidants, bactericidal agents, clay stabilizing agents, pH buffers, clay dispersions, dispersants, emulsifiers, and the like. Especially advantageous is the incorporation of a suitably compatible crosslinking agent for the water soluble polymer, which can be added to the suspension. The crosslinking agent has significant effect upon the hydratable polymer in the suspension until addition of the suspension to an aqueous liquid as hereinafter described.

The suspension of the present invention can be utilized to produce a viscosified aqueous liquid by admixing a quantity of the suspension with an aqueous liquid. The suspension is readily dispersed in the aqueous liquid and the water-soluble polymer rapidly hydrates to yield viscosity to the fluid without the undesirable formation of fish eyes or other undesirable agglomerates. The crosslinking agent, if present, crosslinks the water-soluble polymer upon dissolution in the aqueous liquid.

To further illustrate the process of the present invention, but not by way of limitation, the following examples are provided.

EXAMPLE I

To illustrate the stability of the suspension of the present invention, the following test was performed. To 250 ml of diesel in a Waring blender is added 5.3 ml of a 40% active material emulsion comprising the suspending agent of the present invention. Once the liquids are uniformly dispersed, 198 grams of hydroxypropylguar is uniformly mixed with the liquid followed by an additional 15 ml of the suspending agent. The suspension after thorough mixing then is transferred to a sealed storage container comprising a glass jar. After thirty days the suspension is found to be stable with only a slight amount of settling which is readily redispersed upon only slight shaking of the glass jar. The suspension contained four pounds of HPG per gallon of suspension.

To prepare a viscosified aqueous fluid, samples in the amount of 1.8 ml and 3.0 ml respectively of the suspension were admixed with 250 ml samples of water in a Waring blender. The water rapidly viscosified to a level corresponding to a 30 pound/1000 gallon and 50 pound/1000 gallon gel produced by conventional methods of adding dry polymers to an aqueous fluid. No fish eyes or agglomerates were found to form on admixing the suspension with the water.

EXAMPLE II

To illustrate the commercial scale mixing of the suspension of the present invention, the following test was performed. To 580 gallons of diesel in a mixing tub was added 47 gallons of a 40% active material emulsion comprising the suspending agent of the present invention. Thereafter, 3825 pounds of hydroxypropylguar are adxixed with the liquid and recirculated to the storage vessel by passage through a centrifugal pump. The suspension comprised 840 gallons having a water-soluble solids content of 4 pounds per gallon. The suspension was utilized to form a viscosified aqueous fluid by adxixing 250 gallons of the suspension with 20,000 gallons of 2% potassium chloride solution to yield a fluid corresponding to a 50 pound/1000 gallon gel. The gelled fluid produced from the suspension of the present invention had an initial viscosity in excess of 48 centipoise.

While that which is considered to be the preferred embodiment of the invention has been set forth hereinbefore, it is to be understood that changes and modifications can be made in the composition and method of preparation without departing from the spirit or scope of the appended claims.

What is claimed is:

1. A liquid suspension of a water-soluble polymer or salt consisting essentially of:
   a hydrocarbon liquid;
   an aqueous emulsion of a suspension agent comprising water-insoluble polymer particles having a dry weight average particle size of below 10 $\mu$m and which is formed from monomers of which from about 80 to 100% are hydrophobic, from about 30 to 100% are polar and from about 0 to 20% are hydrophilic whereby said suspending agent is caused to swell at least four times the dry volume of the particle when contacted with a liquid hydrocarbon, said suspending agent being admixed with said hydrocarbon liquid in an amount of from about 0.1% to about 15% by weight of said hydrocarbon liquid; and
   said water-soluble polymer, water-soluble salt or admixture thereof present in an amount of from about 2% to about 60% by weight of said suspension.

2. The suspension of claim 1 wherein said suspension agent comprises from about 80 to about 100% $C_1$-$C_{30}$ alkyl methacrylate monomers and from about 0 to about 20% hydrophilic monomers.

3. The suspension of claim 1 wherein said suspension agent comprises from about 90 to about 100% 2-ethylhexylacrylate and from about 0.5 to about 10% acrylic acid.

4. The suspension of claim 1 wherein said suspension agent is present in an amount of from about 1% to about 10% by weight of said hydrocarbon.

5. The suspension of claim 1 wherein said watersoluble polymer is present in an amount of from about 25% to about 60% by weight of said suspension.

6. The suspension of claim 1 wherein said watersoluble salt comprises at least one member selected from the group consisting of sodium chloride, potassium chloride, sodium carbonate, sodium bicarbonate, potassium carbonate and potassium bicarbonate.

7. A method of preparing a liquid suspension of a water-soluble polymer consisting essentially of:
   admixing a hydrocarbon liquid with a first quantity of an aqueous emulsion of a suspension agent comprising water-soluble polymer particles having a dry weight average particle size of below 10 $\mu$m and which is formed from monomers of which from about 80 to 100% are hydrophobic, from about 30 to 100% are polar and from about 0 to 20% are hydrophilic whereby said suspending agent is caused to swell at least four times the dry volume of the particle when contacted with a liquid hydrocarbon, said first quantity comprising from about 0% to about 100% of the total quantity of suspension agent to be admixed with said hydrocarbon liquid;
   admixing a quantity of a water-soluble polymer with said hydrocarbon liquid and suspension agent said water-soluble polymer being present in an amount of from about 2% to about 60% percent by weight of said suspension, and
   admixing the remainder of said aqueous emulsion of said suspension agent with said mixture of hydrocarbon liquid and water-soluble polymer whereby said suspension agent is present in said suspension in an amount of from about 0.1% to about 15% by weight of said hydrocarbon liquid whereby a substantially stable liquid suspension of said water-soluble polymer is produced.

8. The method of claim 7 wherein said suspension agent comprises from about 80 to about 100% $C_1$-$C_{30}$ alkyl methacrylate monomers and from about 0 to about 20% hydrophilic monomers.

9. The method of claim 7 wherein said suspension agent comprises from about 90 to about 100% 2-ethylhexyl acrylate and from about 0.5 to about 10% acrylic acid.

10. The method of claim 7 wherein said watersoluble polymer is present in an amount of from about 25% to about 60% by weight of said suspension.

11. The method of claim 7 wherein said water-soluble polymer comprises at least one member selected from the group consisting of guar gum, hydroxypropylguar, carboxymethylhydroxypropylguar hydroxyethylcellulose and carboxymethylhydroxyethylcellulose.

12. The method of claim 7 wherein said admixture of hydrocarbon liquid, suspension agent and polymer is subjected to passage through a centrifugal pump during said admixing of the remainder of said suspension agent with said mixture.

13. The method of claim 7 wherein said admixture of hydrocarbon liquid, suspenion agent and water-soluble polymer is subjected to high shearing during said admixing.

14. A method of preparing an aqueous treatment fluid consisting essentially of:
   preparing a liquid suspension of a water-soluble polymer comprising admixing a hydrocarbon liquid with an aqueous emulsion of a suspension agent comprising water-insoluble polymer particles having a dry weight average particle size of below 10 $\mu$m and which is formed from monomers of which from about 50% to 100% hydrophobic, from about 30% to 100% are polar and from about 0% to 20% are hydrophilic whereby said suspending agent is caused to swell at least about four times the dry volume of the particle when contacted with a liquid hydrocarbon, said water-insoluble polymer being present in an amount of from about 0.1% to about 15% by weight of said hydrocarbon liquid, and then admixing a water-soluble polymer with said hydrocarbon and suspension agent to form said liquid suspension, said water-soluble polymer being present in an amount from 2% to about 60% by weight of said liquid suspension; and admixing a predetermined quantity of said liquid suspension with an aqueous fluid whereby said water-soluble polymer in said liquid suspension rapidly hydrates to yield viscosity to said aqueous fluid without the formation of agglomerates of said water-soluble polymer in said aqueous fluid.

15. The method of claim 14 wherein said suspension agent comprises from about 80 to about 100% $C_1$-$C_{30}$ alkyl methacrylate monomers and from about 0 to about 20% hydrophilic monomers.

16. The method of claim 14 wherein said suspension agent comprises from about 90 to about 100% 2-ethylhexylacrylate and from about 0.5 to about 10% acrylic acid.

17. The method of claim 14 wherein said watersoluble polymer is present in an amount of from about 25% to about 60% by weight of said suspension.

18. The method of claim 14 wherein said watersoluble polymer comprises at least one member selected from the group consisting of guar gum, hydroxypropylguar, carboxymethylhydroxypropylguar, hydroxyethylcellulose and carboxymethylhydroxyethylcellulose.

19. The method of claim 14 wherein said adxixture of hydrocarbon liquid, suspenion agent and water-soluble polymer is subjected to high shearing during said admixing.

* * * * *

UNITED STATES PATENT AND TRADEMARK OFFICE
CERTIFICATE OF CORRECTION

PATENT NO. : 4,772,646

DATED : September 20, 1988

INVENTOR(S) : Weldon M. Harms and Lewis R. Norman

It is certified that error appears in the above-identified patent and that said Letters Patent is hereby corrected as shown below:

In column 3, line 15, the word "tean" should read —bean—.

In column 3, line 57, the word "adxixed" should read —admixed—.

In column 4, line 2, the word "th" should read —the—.

In column 7, line 11, the word "cortains" should read —contains—.

In column 7, line 35, the word "adxixed" should read —admixed—.

In column 7, line 46, the word "adxixed" should read —admixed—.

In column 7, line 50, the word "equiprint" should read —equipment—.

In column 8, line 2, the word "apparting" should read —imparting—.

In column 8, line 3, the word "adxixing" should read —admixing—.

In column 9, line 13, the word "adxixed" should read —admixed—.

UNITED STATES PATENT AND TRADEMARK OFFICE
CERTIFICATE OF CORRECTION

PATENT NO.  : 4,772,646

DATED       : September 20, 1988

INVENTOR(S) : Weldon M. Harms and Lewis R. Norman

It is certified that error appears in the above-identified patent and that said Letters Patent is hereby corrected as shown below:

In column 9, line 18, the word "adxixing" should read --admixing--.

In column 10, line 7, the word "water-soluble" should read --water-insoluble--.

Signed and Sealed this

Twenty-seventh Day of June, 1989

Attest:

DONALD J. QUIGG

*Attesting Officer*　　　*Commissioner of Patents and Trademarks*